United States Patent
Cram

(10) Patent No.: US 10,510,327 B2
(45) Date of Patent: Dec. 17, 2019

(54) MUSICAL INSTRUMENT FOR INPUT TO ELECTRICAL DEVICES

(71) Applicant: Harman International Industries, Inc., Stamford, CT (US)

(72) Inventor: Tom Cram, Salt Lake City, UT (US)

(73) Assignee: Harman International Industries, Incorporated, Stamford, CT (US)

( * ) Notice: Subject to any disclaimer, the term of this patent is extended or adjusted under 35 U.S.C. 154(b) by 64 days.

(21) Appl. No.: 15/499,437

(22) Filed: Apr. 27, 2017

(65) Prior Publication Data

US 2018/0315404 A1 Nov. 1, 2018

(51) Int. Cl.
*G10H 1/00* (2006.01)
*G06F 3/023* (2006.01)

(52) U.S. Cl.
CPC ......... *G10H 1/0008* (2013.01); *G06F 3/023* (2013.01); *G10H 2210/061* (2013.01); *G10H 2210/066* (2013.01); *G10H 2220/091* (2013.01); *G10H 2220/191* (2013.01)

(58) Field of Classification Search
CPC ........... G10H 1/0008; G10H 2210/061; G10H 2210/066; G10H 2220/091; G10H 2220/191; G06F 3/023
USPC .......................................................... 84/609
See application file for complete search history.

(56) References Cited

U.S. PATENT DOCUMENTS

| | | | | |
|---|---|---|---|---|
| 4,688,464 A * | 8/1987 | Gibson | ...................... | G10G 7/02 324/76.24 |
| 5,636,128 A * | 6/1997 | Sugimoto | .......... | G06K 9/00523 702/70 |
| 5,723,802 A * | 3/1998 | Johnson | ............... | G10H 1/0066 84/477 R |
| 6,081,266 A * | 6/2000 | Sciammarella | .......... | G06F 3/165 715/727 |
| 6,121,529 A * | 9/2000 | Nakata | ................. | G09B 15/002 84/470 R |
| 6,235,979 B1 * | 5/2001 | Yanase | ................. | G09B 15/023 84/477 R |
| 6,639,141 B2 * | 10/2003 | Kay | ......................... | G10H 1/00 84/609 |
| 7,271,329 B2 * | 9/2007 | Franzblau | ................ | G09B 5/02 84/454 |
| 7,799,986 B2 * | 9/2010 | Ryle | ........................ | G10H 1/053 84/723 |
| 8,507,781 B2 * | 8/2013 | Lupini | ................. | G10H 1/0008 84/611 |
| 9,805,702 B1 * | 10/2017 | Lane | ........................ | G10H 1/08 |
| 2001/0023635 A1 * | 9/2001 | Taruguchi | ............ | G10H 1/0008 84/609 |
| 2003/0094091 A1 * | 5/2003 | Brinkman | .............. | G06Q 20/00 84/609 |
| 2004/0144241 A1 * | 7/2004 | Juskiewicz | .......... | G10H 1/0058 84/723 |
| 2004/0187673 A1 * | 9/2004 | Stevenson | ................ | G10H 1/02 84/737 |
| 2007/0227335 A1 * | 10/2007 | Fukada | ................ | G10H 1/0008 84/600 |

(Continued)

*Primary Examiner* — David S Warren
*Assistant Examiner* — Christina M Schreiber
(74) *Attorney, Agent, or Firm* — Brooks Kushman P.C.

(57) ABSTRACT

A musical instrument system is described to operate as a human to machine input device. The musical instrument outputs an audio signal that is processed to control the movement of an indicator in a computer.

18 Claims, 7 Drawing Sheets

(56) References Cited

U.S. PATENT DOCUMENTS

| | | | |
|---|---|---|---|
| 2008/0163736 A1* | 7/2008 | Demsey | G10H 3/186 84/297 R |
| 2011/0191674 A1* | 8/2011 | Rawley | G06F 3/016 715/702 |
| 2012/0067192 A1* | 3/2012 | Nielsen | G10G 7/02 84/454 |
| 2012/0192701 A1* | 8/2012 | Watanabe | G10H 1/40 84/622 |
| 2014/0260909 A1* | 9/2014 | Matusiak | G10H 1/0025 84/609 |
| 2017/0188106 A1* | 6/2017 | Harb | H04N 21/4755 |
| 2017/0330539 A1* | 11/2017 | Little | G10H 1/08 |
| 2018/0158358 A1* | 6/2018 | Hayafuchi | G09B 15/023 |
| 2018/0166064 A1* | 6/2018 | Saino | G10L 13/00 |
| 2018/0267772 A1* | 9/2018 | Lee | G06F 3/165 |
| 2018/0315404 A1* | 11/2018 | Cram | G10H 1/0008 |

* cited by examiner

MUSICAL INSTRUMENT FOR INPUT TO ELECTRICAL DEVICES

TECHNICAL FIELD

Aspects of the present disclosure provide a musical instrument, e.g., a guitar, that uses its output signal to control an input to a computing device, and more particularly to operating a cursor using musical input from the musical instrument.

BACKGROUND

The use of computers in the making of music continues to grow. However, musicians may prefer to keep their hands on the musical instrument rather than reaching for a keyboard or mouse to manipulate the computer.

SUMMARY

As described herein a musical instrument, e.g., a guitar, is used as an input device to control operation of an electrical device. In an example embodiment, a musical system includes a guitar to produce musical audio signals and an electrical device to receive the musical audio signals and process the musical audio signals to control an indicator on a graphical user interface of a display operably connected to the electrical device.

In an example embodiment, the electrical device includes a processor to detect a rake upward in the musical audio signal and to control a movement of the indicator in a first direction based on the rake upward.

In an example embodiment, the electrical device includes a processor to detect a rake downward in the musical audio signal and to control a movement of the indicator in a second direction based on the rake downward.

In an example embodiment, the electrical device includes a processor to detect an increase in pitch in the musical audio signal to move an indicator in a first direction and a decrease in pitch in the musical audio signal to move the indicator in a second direction.

In an example embodiment, the electrical device includes a processor to switch a control mode to start the processing of the musical audio signal to control the indicator.

In an example embodiment, the processor switches to control mode when a sequence of notes or chords are detected in the musical audio signal.

In an example embodiment, the processor switches to control mode when a signal from a switch is received.

In an example embodiment, the electrical device includes a processor to detect a first rake upward in the musical audio signal to move the indicator in a first direction. The processor can also detect a second rake upward in the musical audio signal to move the indicator to an end of selectable elements in the first direction, wherein the second rake is at a different speed than the first rake. In an example, the second rake upward is faster than the first rake. The processor can further detect a third rake downward in the musical audio signal to move the indicator in a second direction different from the first direction and detect a fourth rake downward in the musical audio signal to move the indicator to an end of selectable elements in the second direction, wherein the fourth rake is at a different speed than the third rake. In an example, the fourth rake downward is faster than the third rake.

A musical system is described herein and may include a guitar to produce musical audio signals and an electrical device with a cursor to provide human-to-machine interface with the electrical device, and to program cursor movement and selection based on the musical audio signals.

In an example embodiment, the electrical device is adapted to receive the musical audio signals and process the musical audio signals to control movement and selection actions of the cursor on a graphical user interface of a display operably connected to the electrical device.

In an example embodiment, the electrical device includes a processor to detect a rake upward in the musical audio signal and to control a movement of the cursor in a first direction based on the rake upward.

In an example embodiment, the electrical device includes a processor to detect a rake downward in the musical audio signal and to control the movement of the cursor in a second direction based on the rake downward.

In an example embodiment, the electrical device includes a processor to detect an increase in pitch in the musical audio signal to move the cursor in a first direction and a decrease in pitch in the musical audio signal to move the cursor in a second direction.

In an example embodiment, the electrical device includes a processor to switch a control mode to start the processing of the musical audio signal to control the cursor.

In an example embodiment, the processor switches to control mode when a programmed musical phrase is detected in the musical audio signal.

In an example embodiment, the processor switches to control mode when a signal from a switch is received.

In an example embodiment, the electrical device includes a processor to detect: a first rake upward on a first string in the musical audio signal to move the cursor in a first direction; a second rake downward on the first string in the musical audio signal to move the cursor in a second direction opposite the first direction; a third rake upward on a second string in the musical audio signal to move the cursor in a third direction different from the first direction and the second direction; and a fourth rake downward on the second string in the musical audio signal to move the cursor in a fourth direction different than the first direction, second direction and the third direction.

In an example embodiment, the electrical device includes a processor to detect a first programmed musical phrase to select an icon at the cursor location and a second programmed musical phrase to deselect the icon at the cursor location.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
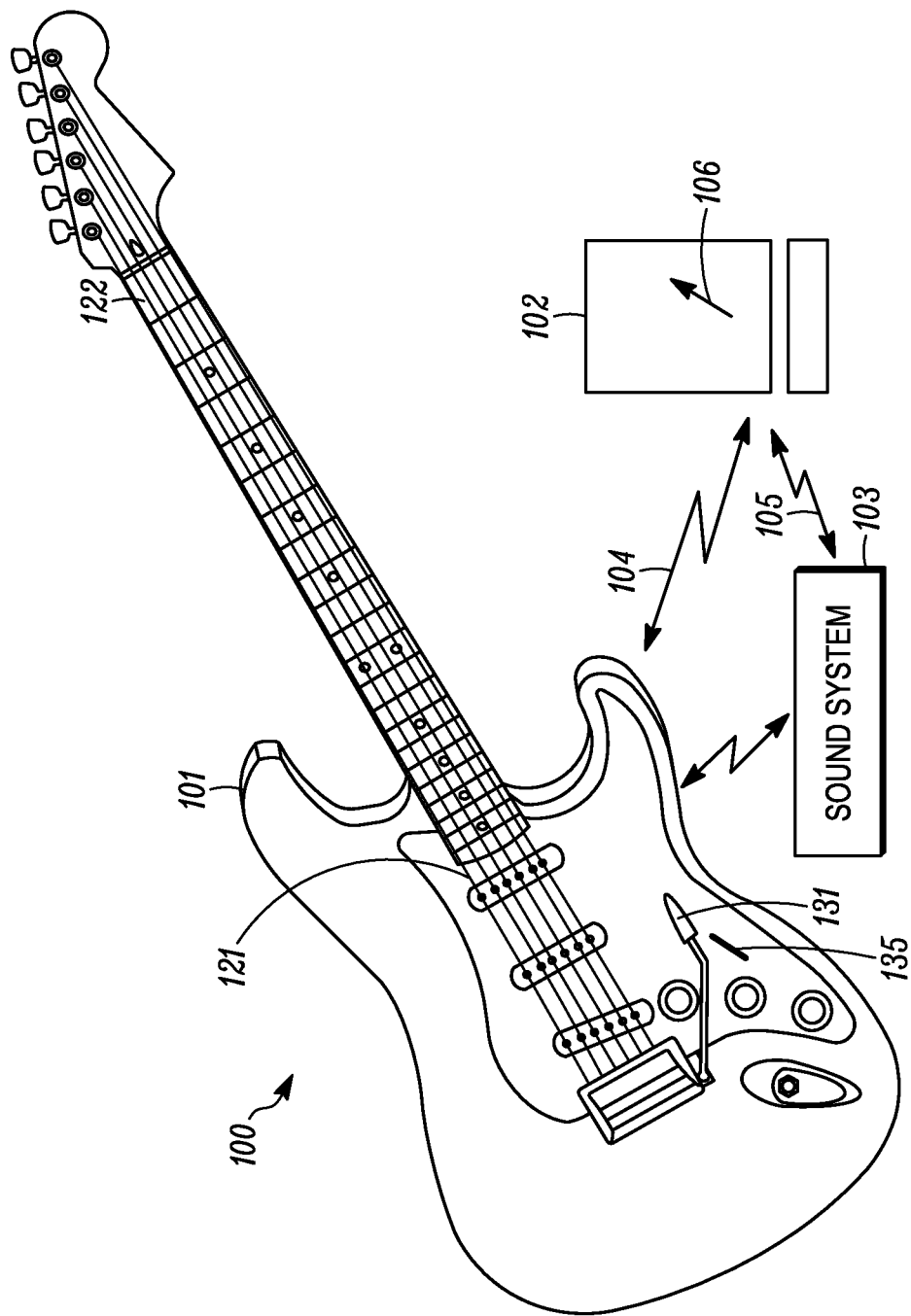
FIG. 1 shows a system using a musical instrument as an electrical device input according to an example embodiment.

FIG. 1 shows a schematic view of a system 100 for using a musical instrument 101 as an input to an electrical device 102 and to a sound system 103. The musical instrument 101 may be a stringed instrument, an electrical guitar, an acoustic guitar, a bass, a violin, a cello, or the like. The musical instrument 101, in some example embodiments, may be a keyboard, a piano, a brass instrument or a woodwind instrument. Musical instruments that are not electric instruments may be include a microphone (or be mic'd) to sense the acoustical signal and output an electrical signal that can be used by the electrical device 102. In an example embodiment, a microphone device is placed on or adjacent the musical instrument and senses the acoustic music. The microphone device may output a musical signal to the electrical device for processing to provide an input signal to the electrical device. The microphone device may process the musical output from the instrument to output an input signal to the electrical device 102. The electrical device 102 may be a computer or an audio processing unit with an indicator, e.g., a cursor, for human-to-machine interface. The electrical device 102 can receive an electrical signal from the instrument 101. In an example, a specific musical phrase can trigger the electrical device 102 to interpret the music from the instrument 101 as an input signal to the electrical device 102. The musical phrase can be a change in pitch, a rake, a volume change, a sequence of notes, or a combination thereof. The musical phrase can be programmed into the electrical device 102 such that when the musical phrase is sensed at the electrical device 102, it will perform the action associated with the musical phrase.

The musical instrument 101 can be a guitar with multiple strings that are tuned to provide a certain note when open. Other notes are played when the musician engages a string at a fret. The sequence of these notes may be used to input a command to the electronic device 102. The change in pitch produced by a guitar can also input commands into the electronic device 102. For example, a guitar player can play a note and change the pitch to produce a change in the control signal sent to the electronic device.

The electronic device 102 can receive the signal directly from the musical device 101 over a communication channel 104, e.g., over a wired connection or a wireless connection. The communication channel 104 can be a communication network, e.g., a local area network or a global communication network. The electronic device 102 can receive a signal from the sound system 103 that is connected to the musical instrument 101 over a communication channel 105.

In the electrical device 102, a controller may receive signals from the musical instrument and analyze the sound generated by the musical device 101, e.g., detecting notes and/or changes in pitch. The controller includes circuitry to process signals and output processed control signals. The controller can generate instructions based on the notes being played or a change in the notes being played. In an example embodiment, the controller can analyze the electrical signals generated by one guitar string including oscillations that are filtered and amplified by analog filters and analog amplifiers. If the input mode is started, e.g., by pressing a button on the guitar, turning a dial, flipping a switch or activating a foot switch, or by playing a certain note pattern with a certain rhythm, then the change in the sound from the musical instrument 101 will generate a change in the position of an I/O on the electrical device 102. The change in the I/O can cause changes in a selected menu or movement of a cursor. Pressing the footswitch may change the direction of the input, e.g., change of a control from up and down to left and right, for a cursor control. Another action on the musical device can be a selection instruction. Other commands may be generated based on the sound from the musical instrument.

The electrical device 102 may include an indicator 106, e.g., the cursor, that is used to show the location of an input device in a graphical user interface on a display that corresponds to a position of an input/output (I/O) device. The indicator 106 is a machine to human interface. A parameter from the musical instrument 101 provides the control signal that moves the location of the indicator 106 in the graphical user interface. The parameter can be a change in pitch, or other change as described herein, produced by the musical instrument 101 on which the movement of the indicator can be controlled.

In an example with the musical instrument 101 being a six-string guitar with standard tuning, i.e., with the string pitches as E, A, D, G, B, and E, from lowest (low E) to highest (high E). This standard tuning is used by most guitarists. However, other tunings can be used with this presently described systems and methods. Each of the strings can be assigned to a specific input parameter to the electronic device. In an example embodiment, the low E string 121 can control the X direction movement of the indicator. The A note at the fifth fret can be the neutral, or stop parameter for the indicator. The A note may be at the frequency of 110 Hz, or exactly two octaves below the standard orchestral reference pitch of 440 Hz. When the musician plays the A note on the low E string, then the parameter instruction to stop movement of the indicator in the X direction is produced. If the pitch on the E string is lowered, e.g., the musician plays a note on the low E string that is lower in pitch (e.g., G at 98 Hz. or F at 87 Hz.) or slides toward the guitar head the parameter instruction to move the indicator to the left on the display is generated. When the musician returns to play the A note, then the indicator stops. In another example, the movement of the indicator stops when a change in pitch stops. Any of the other strings can control the Y direction movement of the indicator. For example, the A string 122 can control the Y direction movement of the indicator. The D note at the fifth fret (147 Hz.) can be the neutral, or stop parameter for the indicator in the Y direction. If the pitch on the A string is lowered, e.g., the musician plays a note on the A string that is lower in pitch (e.g., C at 131 Hz. or B at 123 Hz.) or slides toward the guitar head the parameter instruction to move the indicator to the down on the display is generated. When the musician plays the D note on the A string, then the parameter instruction to stop movement of the indicator in the Y direction is produced. If the pitch on the A string is raised, e.g., the musician plays a note on the A string that is higher in pitch or slides toward the guitar body the parameter instruction to move the indicator to the right on the display is generated. When the musician returns to play the D note, then the indicator stops. In another example, the movement of the indicator stops when a change in pitch stops. Other combination of strings can also be used to control movement of the indicator. For example, either of the E strings can control the X direction movement. The other strings (A, D, G or B tuned strings) can control the Y direction movement. In an example embodiment, one of the strings can provide input to select an input at the location of the indicator 106 on the electronic device 102.

The musical phrase output from the musical instrument 101 to control the electrical device can be sequence of notes or a specific a change in pitch. The musical phrase can be programmed into the electrical device 102. The user can trigger the start of the musical phrase programming in the electrical device 102 for a first control in the electrical device. The user plays the musical phrase, which is input into the electrical device 102. When the musical phrase ends, the user indicates end programming in the electrical device 102. This process can be repeated for each of the controls for the indicator on the graphical user interface in the electrical device 102. In the cursor example, there can be six musical phrases associated with six inputs to the electrical devices, namely, movement up, movement down, movement left, movement right, select and un-select. Each of the inputs can be programmed into the electrical device 102. The electrical device 102 stores the programmed musical phrases in a memory.

As shown in FIG. 1, a guitar may include a vibrato system 131 which can change the pitch of sound produced by the musical instrument without the musician changing their hand position in the fretboard. This change in pitch, higher or lower, may also produce a musical sequence that controls movement of the indicator. A vibrato system 131 may include a whammy bar, vibrato arm/bar, or tremolo arm/bar, which add vibrato to the sound by changing the tension of the strings, typically at the bridge or tailpiece of an electric guitar. The bar or arm enables the player to vary the tension and, sometimes, the length of the strings temporarily, changing the pitch to create a vibrato, portamento or pitch bend effect.

The musical instrument 101 may include a switch 135 that can be moved to select on position, an off position or an input position that changes the output of the musical instrument to output a control for an indicator on an electronic device. The musical instrument can include a processor that senses the music, e.g., change in pitch, being played to output the control signal to an electronic device. For example, the music pitch is sensed by a processor in the guitar. The processor converts the musical sound, e.g., pitch or change in pitch, to a control signal that is output to the electrical device 102 to control the indicator 106 through the communication channel 104.

Figure 2:
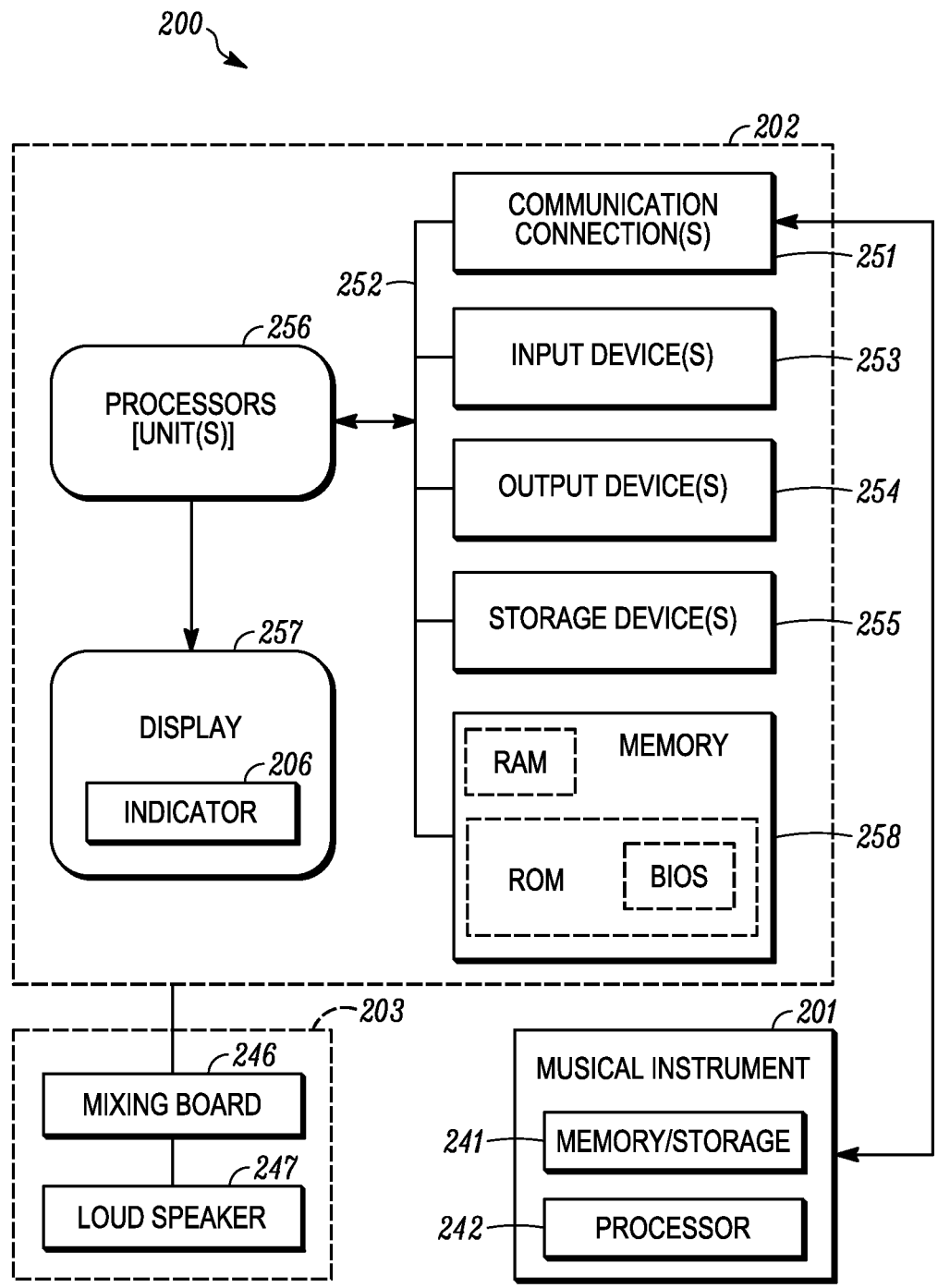
FIG. 2 shows a system using a musical instrument as an electrical device input according to an example embodiment.

FIG. 2 shows a schematic view of an embodiment of a musical/electrical system 200 with a musical instrument 201 in communication with an electrical device 202 and a sound system 203. Elements that are similar to those in the embodiment shown in FIG. 1 have a similar reference number with the most significant digit changed to 2. The musical instrument 201 is designed to be played by a person and may be any musical device described herein or other. The musical device 201 includes a memory to store musical sequences. The stored musical sequences can include a parameter that if played will output the control signal to the electrical device. The musical device 201 includes a memory/storage 241 and a processor 242 that can load instructions and control musical parameters, which can be used to produce control signals. The instructions in the processor can compare the musical output from the musical instrument to the stored musical parameters that are control sequences. In another mode of operation, the musical instrument 201 outputs musical signals to the sound system 203 and the electrical device 202. The sound system can include a mixing board 246 and a loudspeaker 247. The mixing board 246 can perform processing of the musical signal, e.g., digital signal processing, and output a signal to the loudspeaker 247 for broadcast.

The electrical device 202 can receive the musical signal from the musical instrument or from the sound system 203. The electrical device 202 includes a communication connection(s) 251 that enable communication between the electrical device and other electrical devices. A bus 252 that connects the communication connection with an input device 253, and output device 254, a storage device 255, a memory 258 and a processor(s) 256. The memory can include a RAM, a ROM and BIOS. The storage device can be a long-term storage for instructions and data and may be a hard drive or cloud-based storage. The processor 256 can load instruction to analyze parameters related to the musical sequence, e.g., pitch or change in pitch. The analysis may be comparison to the input musical signal with a stored musical sequence that to determine if the musician intends to operate the indicator 206 on the display 257. The display 257 can be conveniently placed so that the musician can see the display with their hands remaining on the musical instrument. The stored musical sequence can be a default sequence loaded into the storage device or the memory of the electrical device 202. In an example, the comparison is launched when the musical instrument produces a start signal, e.g., using a switch of a specific pattern of notes or pitches.

Figure 3:
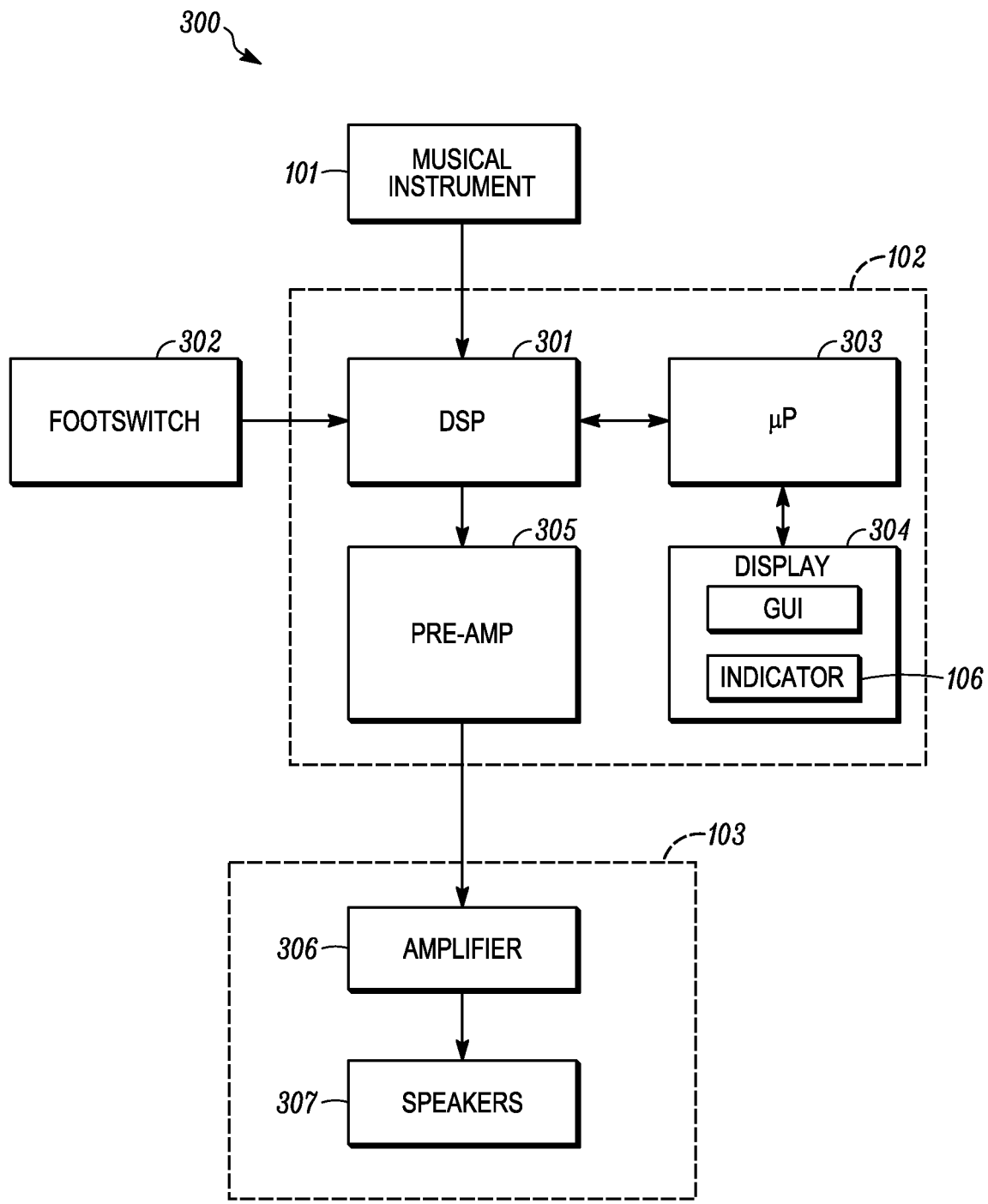
FIG. 3 shows a musical instrument as an electrical device input according to an example embodiment.

FIG. 3 shows a schematic view of another embodiment of the musical system 300, which includes the musical instrument, 101 an electrical device 102 and a sound system 103. The musical instrument 101 produces a sound signal that is input directly into the electrical device 102. The electrical device 102 has a digital signal processor (DSP) 301 that receives the input from the musical instrument 101. A switch 302, e.g., a footswitch that can be part of an effects board, can turn on the analysis for the musical instrument 101 can an I/O device for an indicator 103 on the display 304 that can be showing a graphical user display. A processor 303 can receive signals from the DSP 301 and output control signals to the display 304 to control the indicator 106. A preamplifier 305 receives the signal from the DSP 301 and outputs a musical signal conditioned by the DSP 301 to the sound system 103. The sound system 103 may include an amplifier 306 and loudspeakers 307.

Figure 4:
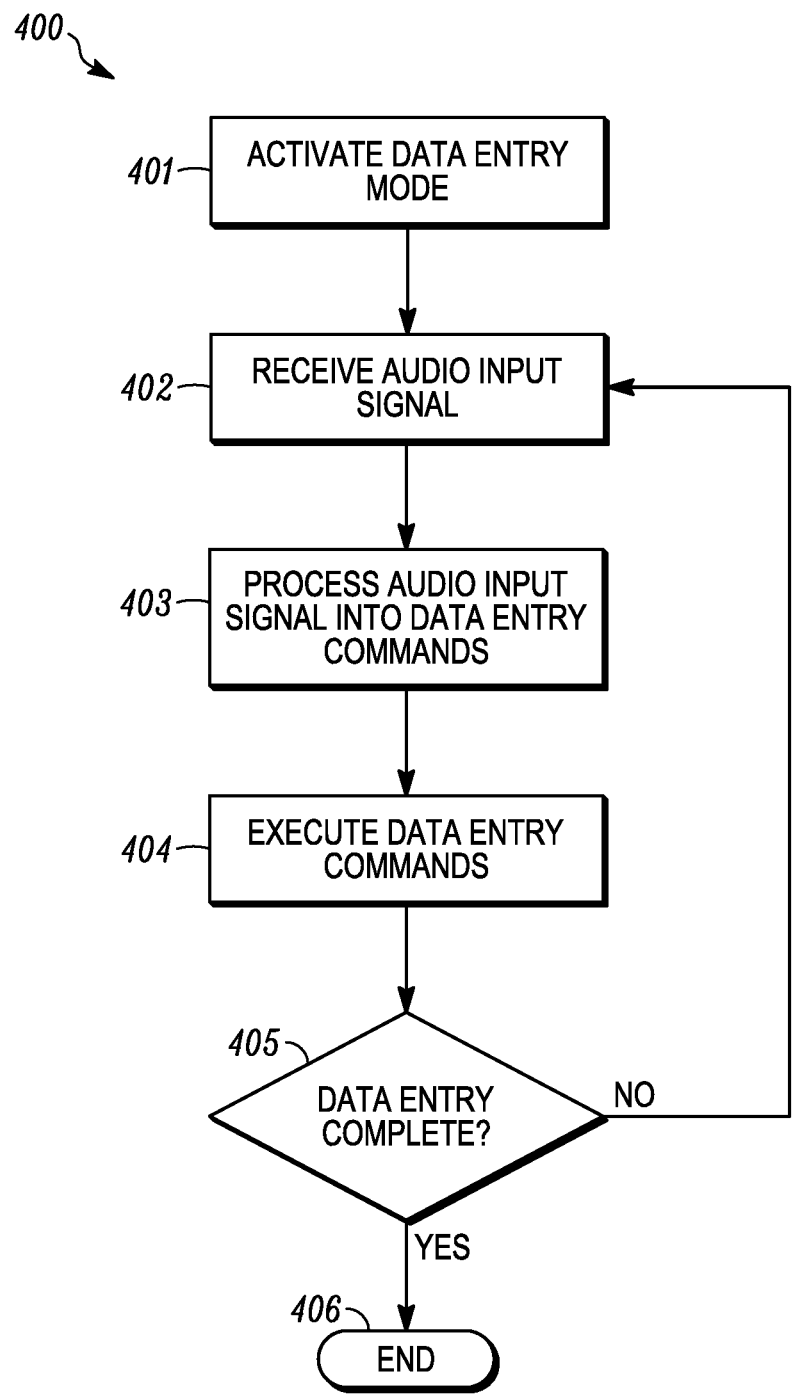
FIG. 4 shows a method using of a musical instrument as an electrical device input according to an example embodiment.

FIG. 4 shows a signal processing method 400 for using a musical instrument to control an electronic device, e.g., a cursor on a display. At 401, the data entry mode is activated. The data entry mode activates the system to interpret the musical sounds output from the instrument to be control signals. The control signals can be I/O signals for cursor control. At 402 the audio input signals are received. At 403, the audio input signal is processed to convert the audio input signals to data entry commands. The processing can be a comparison to stored values that correspond to movements of the cursor on a computer display screen. At 404, the data entry commands are executed. In an example, the cursor is moved based on the commands. At 405, it is determined if the data entry operation is complete. If no, then the process returns to step 402. If yes, then the process ends at 406.

Figure 5:
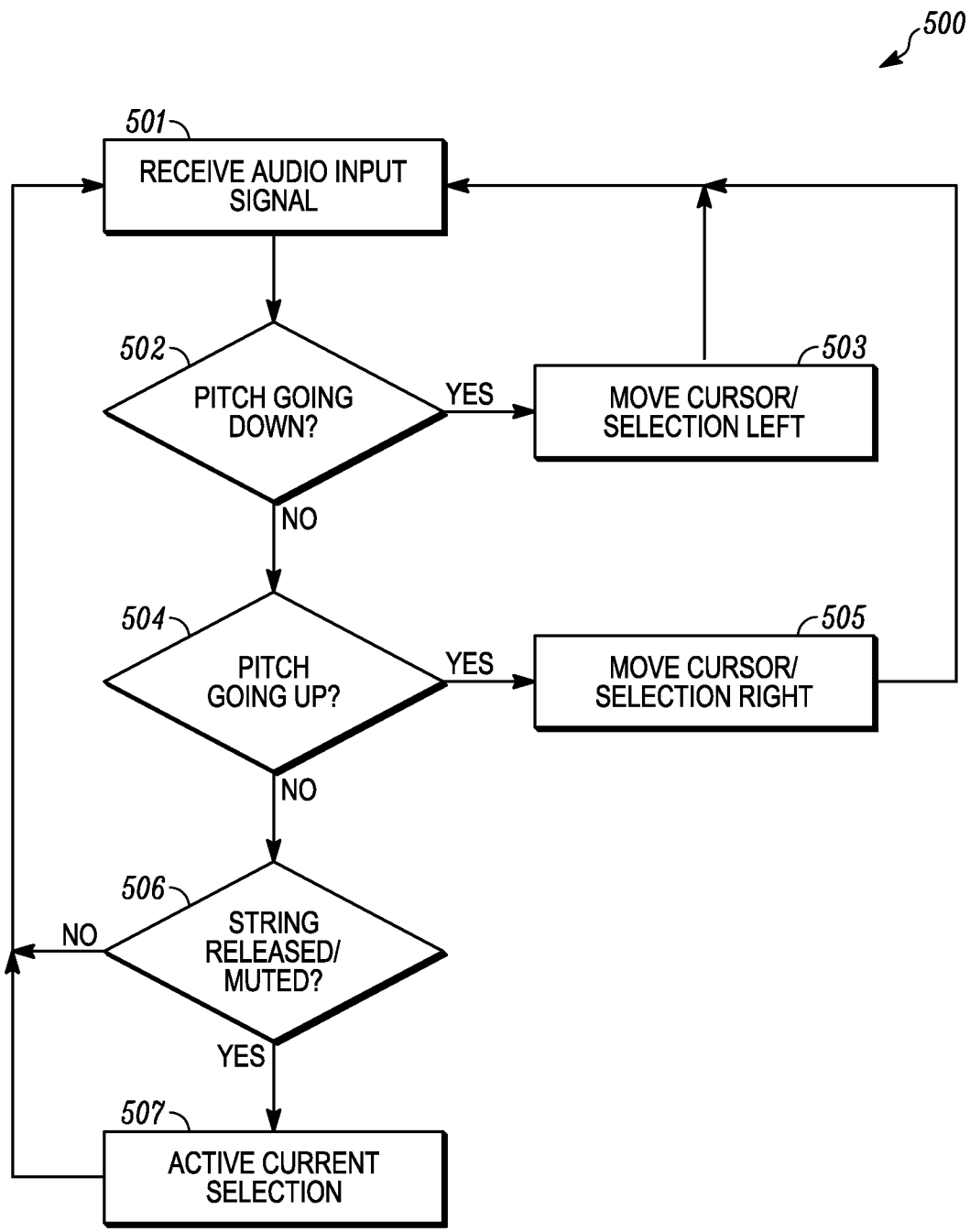
FIG. 5 shows a method using of a musical instrument as an electrical device input according to an example embodiment.

FIG. 5 shows a signal processing method 500 for using a musical instrument to control an electronic device, e.g., a cursor in graphical user interface shown on a display. At 501 the data entry mode is activated and the audio input signals are received. At 502, the input audio signal is analyzed to determine if the pitch is going down. The pitch can be at a certain octave produced by a select string of a guitar. If yes, then at 503 the cursor or selection (GUI) moves to the left or the next left selectable item on the GUI. If no, then at 504 the input audio signal is analyzed to determine if the pitch is going up. The pitch can be at a certain octave produced by a select string of a guitar. If yes, then at 505 the cursor or selection indicator moves to the right or the next right selectable item on the GUI. If no, then the method moves to step 506. At step 506 the received audio input signal is analyzed to determine if the string is released or muted. If not released, then the method returns to 501. If released, then at 507 the current selection is activated. Thereafter the method can return to step 501 to receive additional audio input at 501. A similar method can be used to move the cursor up or down, e.g., using a different string on the guitar or changing position of a control knob or switch on the guitar.

Figure 6:
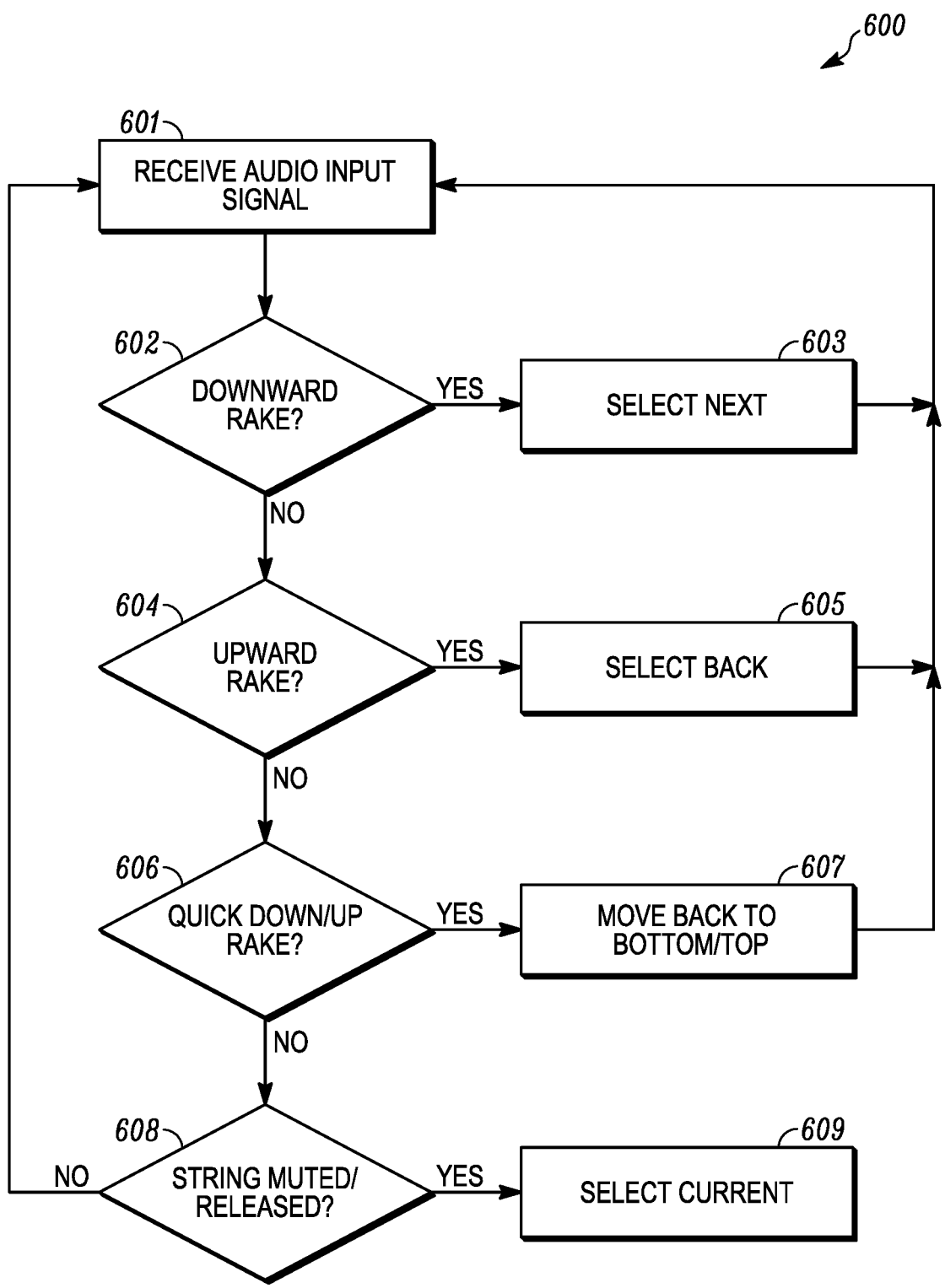
FIG. 6 shows a method using of a musical instrument as an electrical device input according to an example embodiment.

FIG. 6 shows a signal processing method 600 for using a musical instrument to control an electronic device, e.g., a cursor on a display. At 601 the data entry mode is activated and the audio input signals are received. At 602, a determination if a downward rake is in the received audio signal. If yes, then the method at 603 moves to the next selectable element, e.g., an icon, on the GUI. If no, then the method at 604 determines if an upward rake is detected. If yes, then the method moves to step 605 whereat a previous selectable icon is selected. If no, then at 606 it is determined if a quick rake is being performed. A quick rake is faster than the rakes detected in steps 602, 604. At 607, a quick rake down moves the selection to the end of the selectable elements. Also at 607, a quick rake upward moves the selection to the top of the selectable elements. An upward rake is typically in the direction toward the head with a decrease in frequency or pitch. A downward rake is typically in the direction toward the body with an increase in frequency or pitch. If no quick rake is detected at 606, then the method moves to step 608. At 608, it is determined if the string is muted or released. If the string is muted or released, then the current selectable element is selected at 609. If no, then the method returns to 301 to receive additional audio input signals.

Figure 7:
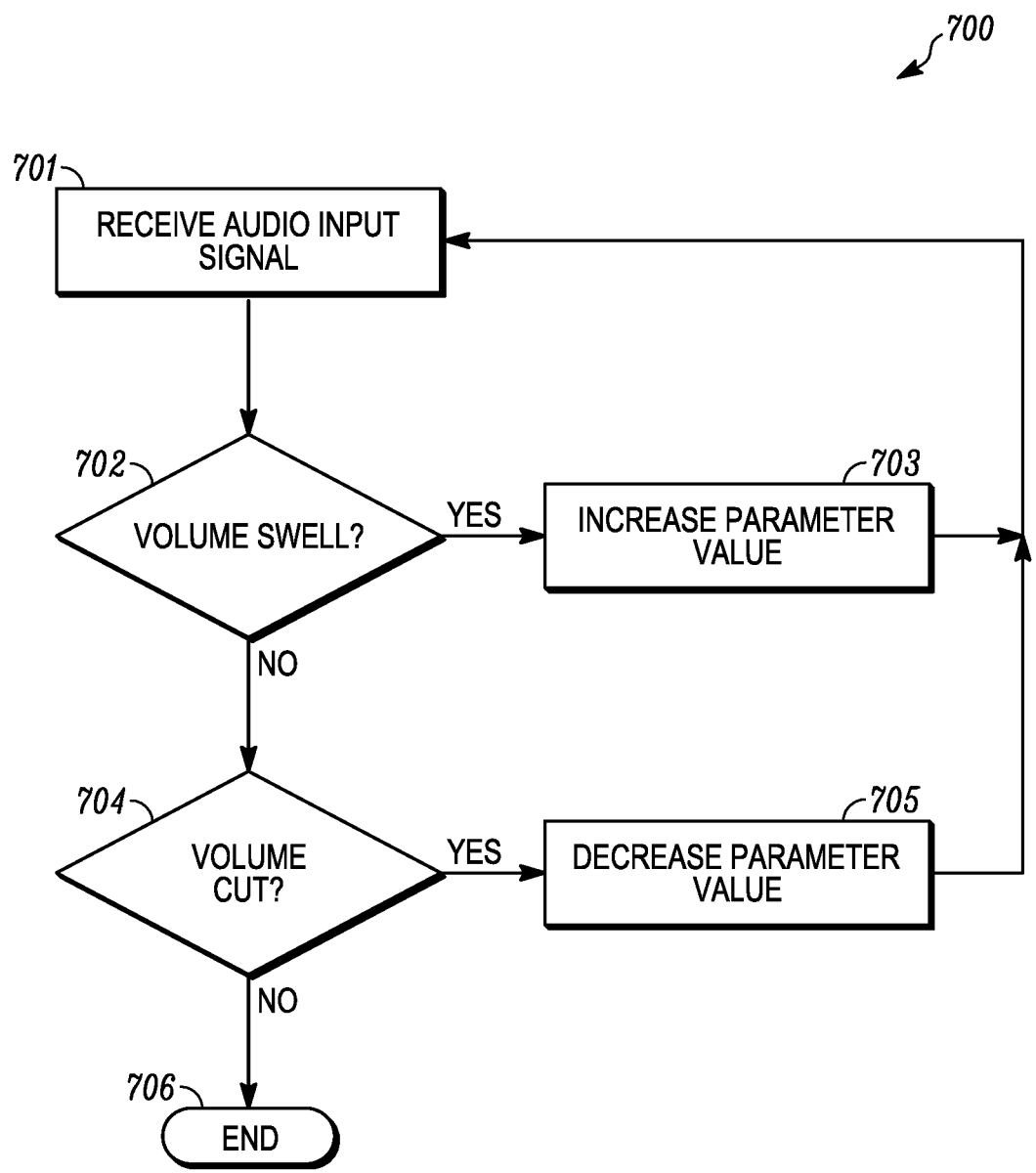
FIG. 7 shows a method using of a musical instrument as an electrical device input according to an example embodiment.

FIG. 7 shows a signal processing method 700 for using a musical instrument to control an electronic device, e.g., a cursor on a display. At 701 the data entry mode is activated and the audio input signals are received. At 702, a determination if a volume swell is in the audio signal. If yes, then at 703 the parameter value is increased. The parameter value can be an indicator control for a graphical user interface. In another embodiment, the parameter value is a number count or an alphanumeric. The alphanumeric can be increased according a modified asci number. If 702 results in a no, then the method moves to step 704 whereat it is determined if the volume is cut. If yes at 704, then at 705 the parameter value is decreased. If no at 704, then the entry ends at 706 or returns to 701.

The comparisons and determination steps in the preceding methods, e.g., 400, 500, 600 and 700 can be performed in a DSP or a processor of an electronic device.

Some embodiments of the present disclosure detect various changes in the audio signal produced by the musical instrument. These detections may be performed over a pattern period. In some embodiments, events are detected based on energy in the digital audio signal in at least one frequency band. In some examples, events are detected by estimating an energy envelope of the received digital audio signal in one or more frequency bands and estimating a derivative of the energy envelope in one or more frequency bands. At least two peaks are identified in the derivative, and the at least two peaks are associated with corresponding events, wherein comparison of the two peaks may indicate the change in the audio signal to trigger an action in the electrical device. According to some embodiments, an event time and level are established by searching forward in the energy envelope from at least one derivative peak.

The present disclosure is not limited to a specific type of guitar and may be used with other instruments. A musician may control the input to an electronic or computing device by playing the musical instrument, which signal is recognized by the electronic device as an input signal. Such a signal may wirelessly control the electronic device. The musical device is in electrical or acoustic (wired or wireless) communication with the electronic device. The musical instrument guitar may act as a mouse, trackball, touchpad, micro joystick or a gyration pointing device, or another type of human machine interface technology, e.g., to control a pointer on the electronic device.

The musical instruments as described herein may be used as input devices to electronic devices, e.g., computers, computing devices, digital signal processors, mixing boards and the like. Specific changes in pitches, notes or other parameters that can be generated by the musical instrument when played by a person may control an I/O input to the electronic device. Specific patterns of parameters can be recognized and converted into the control signals to move the indicator in the GUI. The movement of the indicator can be up or down on a display, movement on a menu or a list of possible selections. Another output from the musical instrument can be a select input. As a result, a musician may navigate, control or edit the actions on an electronic device without removing their hands from the instrument or having to reach out to engage a mouse, keyboard or traditional I/O device.

While some of the described embodiments use a guitar as the musical instrument for providing musical audio signals, e.g., note progressions, sound phrases, and the like, to provide control signals to a computing device, other musical instruments can be used. Other stringed instruments, e.g., bass, bass guitars, cello, violin, chordophones, erhu, viola, banjo, domra, dobra, lute, sitar, and the like, may be used with the present description. It will also be recognized that the rhythm that the notes are played, e.g., with a set time period, may control when the electronic device launches into the control mode. These time periods can be different for each instrument.

The present disclosure may also rely on pitch to trigger a control or provide a control signal for a specific movement or operation. However, pitch may be determined by the tension on a string or the linear density of strings. The initial pitch of the musical instrument can be set in electrical device for triggering a comparison of the musical signal to a stored trigger signal to start a control mode. In an example, the control signal can be set in the electrical device by the user initiating a programming sequence and the musical signal being played on the musical device and stored in the electrical device. Each musical signal can be played for each command and stored in the electrical device.

The embodiments of the present disclosure generally provide for a plurality of circuits or other electrical devices, e.g., the musical instrument, the electrical device, the loudspeaker and the sound system. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the electrical/operational implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and instructions (e.g., software) which co-act with one another to perform operation(s) disclosed herein. In addition, any one or more of the electric devices may be configured to execute a computer-program that is embodied in a computer readable medium that is programmed to perform any number of the functions and features as disclosed. The computer readable medium may be non-transitory or in any form readable by a machine or electrical component.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

I claim:

1. A system for controlling a user interface comprising:
an electronic device, including a display presenting the user interface, programmed to
display a cursor on the user interface
responsive to detection, in an audio signal received by the electronic device, of an upward rake across strings of a string instrument, adjust the location of the cursor in a first direction, and
responsive to detection in the audio signal of a downward rake across the strings of the string instrument, adjust the location of the cursor in a second direction.

2. The system of claim 1, further comprising a musical instrument, wherein the electronic device is further programmed to receive the audio signal from the musical instrument.

3. The system of claim 1, wherein the electronic device is further programmed to:
responsive to detection in the audio signal of an increase in pitch in sound received from a musical instrument, adjust the location of the cursor in a first direction; and
responsive to detection in the audio signal of a decrease in pitch in sound received from the musical instrument, adjust the location of the cursor in a second direction.

4. The system of claim 1, wherein the electronic device is further programmed to:
responsive to detection, in the audio signal, of audio frequencies indicative of plucking one more open strings of a first set of open strings of a guitar, adjust the location of the cursor in a first axis; and
responsive to detection, in the audio signal, of audio frequencies indicative of plucking one more open strings of a second set of open strings of a guitar, adjust the location of the cursor in a second axis.

5. The system of claim 1, wherein the electrical device is further programmed to select an icon at a location of the cursor responsive to detection of a programmed musical phrase in the audio signal.

6. The system of claim 1, wherein the electronic device is programmed to:
in a first mode, provide the audio signal for audio processing, without adjusting the location of the cursor; and
in a second mode, adjust the location of the cursor responsive to the audio signal received by the electronic device.

7. The system of claim 6, wherein the electronic device is programmed to transition from the first mode to the second mode responsive to receipt of a signal from a switch.

8. The system of claim 6, wherein the electronic device is programmed to transition from the first mode to the second mode responsive to identification in the audio signal of a predefined musical phrase.

9. The system of claim 8, wherein the predefined musical phrase includes one or more of a change in pitch, a rake across a plurality of strings of a string instrument, a change in volume, or play of a sequence of notes.

10. A system for controlling a user interface comprising:
an electronic device, including a display presenting the user interface, programmed to
display a cursor on the user interface,
responsive to detection, in an audio signal received by the electronic device, of a rake across strings of a string instrument in a first direction occurring at a first speed, adjust the location of the cursor a first distance in the first direction, and
responsive to detection, in the audio signal, of a rake across the strings of the string instrument in the first direction occurring at a second speed faster than the first speed, adjust the location of the cursor a second distance in the first direction, the second distance being greater than the first distance.

11. A system of claim 10, wherein the electronic device is further programmed to:
responsive to detection, in an audio signal received by the electronic device, of a rake across the strings of the string instrument in a second direction occurring at the first speed, adjust the location of the cursor the first distance in the second direction; and
responsive to detection, in the audio signal, of a rake across the strings of the string instrument in the second direction occurring at the second speed, adjust the location of the cursor the second distance in the second direction.

12. A system for controlling a user interface comprising:
an electronic device, including a display presenting the user interface, programmed to
display a cursor on the user interface,
responsive to detection, in an audio signal received by the electronic device, of a rake across strings of a string instrument in a first direction occurring at a first speed, adjust the location of the cursor to a next item in a sequence of items, responsive to detection, in the audio signal, of a rake across the strings of the string instrument in the first direction occurring at a second speed faster than the first speed, adjust the location of the cursor to a last item in the sequence of items, responsive to detection, in the audio signal, of a rake across the strings of the string instrument in a second direction occurring at a first speed, adjust the location of the cursor to a previous item in a sequence of items, and responsive to detection, in the audio signal, of a rake across the strings of the string instrument in a second direction occurring at a second speed faster than the first speed, adjust the location of the cursor to a first item in the sequence of items.

13. A method for controlling a user interface comprising:
displaying, to a user interface of an electronic device, a cursor providing a visual movable indicator identifying a location on the user interface; and
responsive to the electronic device being in a control mode, adjusting the location of the cursor in accordance with an audio signal received by the electronic device from a musical instrument, the adjusting including
responsive to detection, in the audio signal, of an upward rake across strings of a string instrument, adjusting the location of the cursor in a first direction, and
responsive to detection, in the audio signal, of a downward rake across the strings of the string instrument, adjusting the location of the cursor in a second direction.

14. The method of claim 13, further comprising transitioning to the control mode, from an output mode in which the audio signal is provided for audio processing without adjusting the location of the cursor, responsive to identifying a predefined musical phrase in the audio signal.

15. The method of claim 13, further comprising:
responsive to detection, in the audio signal, of an increase in pitch in sound received from a musical instrument, adjusting the location of the cursor in a first direction; and
responsive to detection, in the audio signal, of a decrease in pitch in sound received from the musical instrument, adjusting the location of the cursor in a second direction.

16. The method of claim 13, further comprising:
responsive to detection, in the audio signal, of audio frequencies indicative of plucking one more open strings of a first set of open strings of a guitar, adjusting the location of the cursor in a first axis; and
responsive to detection, in the audio signal, of audio frequencies indicative of plucking one more open strings of a second set of open strings of a guitar, adjusting the location of the cursor in a second axis.

17. A method for controlling a user interface comprising:
displaying, to a user interface of an electronic device, a cursor providing a visual movable indicator identifying a location on the user interface; and
responsive to the electronic device being in a control mode, adjusting the location of the cursor in accordance with an audio signal received by the electronic device from a musical instrument, the adjusting including
responsive to detection, in the audio signal, of a rake across strings of a string instrument in a first direction occurring at a first speed, adjusting the location of the cursor a first distance in the first direction,
responsive to detection, in the audio signal, of a rake across the strings of the string instrument in the first direction occurring at a second speed faster than the first speed, adjusting the location of the cursor a second distance in the first direction, the second distance being greater than the first distance,
responsive to detection, in the audio signal, of a rake across the strings of the string instrument in a second direction occurring at the first speed, adjusting the location of the cursor the first distance in the second direction, and
responsive to detection, in the audio signal, of a rake across the strings of the string instrument in the second direction occurring at the second speed, adjusting the location of the cursor the second distance in the second direction.

18. A method for controlling a user interface comprising:
displaying, to a user interface of an electronic device, a cursor providing a visual movable indicator identifying a location on the user interface; and
responsive to the electronic device being in a control mode, adjusting the location of the cursor in accordance with an audio signal received by the electronic device from a musical instrument, the adjusting including
responsive to detection, in the audio signal, of a rake across strings of a string instrument in a first direction occurring at a first speed, adjusting the location of the cursor to a next item in a sequence of items,
responsive to detection, in the audio signal, of a rake across the strings of the string instrument in the first direction occurring at a second speed faster than the first speed, adjusting the location of the cursor to a last item in the sequence of items,
responsive to detection, in the audio signal, of a rake across the strings of the string instrument in a second direction occurring at a first speed, adjusting the location of the cursor to a previous item in a sequence of items, and
responsive to detection, in the audio signal, of a rake across the strings of the string instrument in a second direction occurring at a second speed faster than the first speed, adjusting the location of the cursor to a first item in the sequence of items.

* * * * *